United States Patent
O'Connor et al.

(10) Patent No.: US 8,671,045 B2
(45) Date of Patent: Mar. 11, 2014

(54) METHOD AND SYSTEM FOR IMPLEMENTING AN ADAPTIVE INVESTING METHODOLOGY

(75) Inventors: Kevin P. O'Connor, Fircrest, WA (US); Grant W. Gardner, University Place, WA (US); Yuan-An Fan, Puyallup, WA (US)

(73) Assignee: Frank Russell Company, Seattle, WA (US)

( * ) Notice: Subject to any disclaimer, the term of this patent is extended or adjusted under 35 U.S.C. 154(b) by 0 days.

(21) Appl. No.: 13/250,426

(22) Filed: Sep. 30, 2011

(65) Prior Publication Data

US 2013/0085963 A1    Apr. 4, 2013

(51) Int. Cl.
*G06Q 40/00* (2012.01)

(52) U.S. Cl.
USPC .......................................... 705/36 R; 705/35

(58) Field of Classification Search
USPC ....................................................... 705/36 R
See application file for complete search history.

(56) References Cited

U.S. PATENT DOCUMENTS

| | | | |
|---|---|---|---|
| 7,376,608 B1 * | 5/2008 | Dellinger et al. | 705/36 R |
| 2004/0088236 A1 * | 5/2004 | Manning | 705/35 |
| 2007/0011063 A1 * | 1/2007 | Shelon et al. | 705/35 |

* cited by examiner

*Primary Examiner* — Jason M Borlinghaus
*Assistant Examiner* — Ambreen A Alladin
(74) *Attorney, Agent, or Firm* — Davis Wright Tremaine LLP; Heather M. Colburn (57) ABSTRACT

Method and system for implementing an adaptive investing methodology. An asset allocation is determined for each of a plurality of periods of a model duration that optimize an objective function. The asset allocations identify for each of the periods how much of the investment account to invest in one or more asset classes. The objective function subtracts a value of a shortfall risk function from an expected value of an amount of income to be generated by an annuity purchased at the end of the model duration with funds in the investment account at the end of the model duration. The asset allocations are associated with values of a plurality of investor variables. The values of the plurality of investor variables and their associated asset allocations may be stored in one or more wealth tables and used to look up asset allocations for one or more investors.

12 Claims, 4 Drawing Sheets

METHOD AND SYSTEM FOR IMPLEMENTING AN ADAPTIVE INVESTING METHODOLOGY

BACKGROUND OF THE INVENTION

1. Field of the Invention

The present invention is directed generally to a method of investing funds in an investment account, and more particularly to a method of investing funds in an investment account that varies asset allocations between multiple asset classes over time.

2. Description of the Related Art

An investment account is an account that is typically held by an account holder or investor for long-term investment or capital purposes. The investment account may reside at a financial institution, on a record keeping platform (e.g., a record keeping platform that overlays another database account platform), on a database account platform, or the like. The investor or a professional account manager may control how the funds in the account are invested. Typically, the funds in an investment account are invested in multiple asset classes. The portion of the funds invested in each asset class may change over time based on various factors, such as the investor's age, investment goals, etc. For example, target date funds (defined below) vary the percentage of the funds invested in equities over time. Thus, target date funds may be characterized as modifying asset allocations based on the investor's increasing age. However, all investors invested in a particular target date fund have the same asset allocation for the same point on the glide path of the particular target date fund regardless of other factors or considerations relevant to the investors. Therefore, a target date fund may not provide an optimum investment strategy for each investor in the target date fund.

A managed account (defined below) provides more flexibility because a manager may change the asset allocation within the account at any time based on any factor the investor or manager deems relevant. However, managed accounts are expensive and beyond the financial means of many investors.

Therefore, a need exists for a method of determining asset allocations for an investment account that considers factors relevant to the investor holding the investment account. A method that avoids an individualized approach of the type used by managed accounts would be particularly beneficial. A desirable method would not require investor input to determine changes in asset allocation and instead would use only information available from a record keeper (defined below). The present application provides these and other advantages as will be apparent from the following detailed description and accompanying figures.

DETAILED DESCRIPTION OF THE INVENTION

Definitions of Terms

Unless defined otherwise, technical and financial terms used herein have the same meaning as commonly understood by one of ordinary skill in the art to which this invention belongs. For purposes of the present invention, the following terms are defined below.

Asset Allocation: an apportionment of a fund into one or more asset classes.

Asset: a purchasable tangible or intangible item having economic value. Examples of assets include shares in a mutual fund, shares of a stock, bonds, and the like.

Asset Class: a group of securities that exhibit similar characteristics, behave similarly in the marketplace, and are subject to the same laws and regulations. The three main asset classes are equities (e.g., stocks), fixed-income (e.g., bonds), and cash equivalents (e.g., money market instruments). However, asset classes may include additional types of assets, such as real estate related interests, and commodities. Each asset class may reflect different risk, return, or investment characteristics. Further, different asset classes may perform differently in the same market environment.

Capital Preservation Assets: Assets that preserve capital investment. Such assets are typically low risk and frequently provide fixed, often low, returns. Examples of capital preservation assets include fixed income assets (e.g., bonds).

Defined Contribution Pension Plans: A type of retirement plan in which each participant in the plan has an individual account and an employer may contribute an amount to each participant's account periodically (e.g., annually). The account balance is based on employer contributions, participant contributions, participant withdrawals, investment earnings on the money in the account, and expenses.

Glide Path: a plot of the percentage of an investment strategy invested in equity assets (as opposed to non-equity assets) over time.

Growth Assets: Assets that provide investment returns (e.g., capital growth and income) that outperform inflation. Examples of growth assets include equities and other high return and high-risk assets.

Investment Fund: A fund invested in one or more securities that is owned by one or more investors. An investment fund is managed as a single entity by one or more managers.

Immediate Life Annuity: An annuity purchased by an investor for a lump sum that makes periodic payments to the investor during the investor's life. The payments generally terminate upon the investor's death.

Managed Account: An investment account that is owned by an individual investor (or account holder). Asset allocations in the investment account are determined by a professional money manager hired to manage the investment account. Thus, managed accounts may be characterized as personalized investment portfolios tailored to the specific needs of the account holder.

Real Interest Rate: The rate of interest after subtracting inflation.

Record keeper: An entity that performs a record keeping function with respect to an investment account. The record keeping function includes accounting and database maintenance. The record keeper typically maintains a database of account information and processes transactions, such as contributions, transactions, and withdrawals.

Target Date Fund (also known as a Life Cycle Fund, an Age-Based Fund, and a Lifestyle Fund): A "managed" diversified investment fund that over time adjusts the portions of the assets in the fund belonging to a plurality of asset classes (e.g., stocks, bonds, cash equivalents, etc.) according to a target date fund investment strategy (which includes a glide path, typically predetermined). A first portion of the target date fund investment strategy occurs during an accumulation phase and a second portion of the target date fund investment strategy occurs during a decumulation phase. By adjusting the portion of the assets in the fund belonging to each of the plurality of asset classes, the target data fund attempts to manage wealth generated by the fund at the end of the accumulation phase on a "target date." Generally, a target date fund shifts the portion of the assets in the fund belonging to each of the plurality of asset classes towards a more conservative mix as the fund approaches the target date. The managers of theses funds decide issues related to asset allocation, diversification, and rebalancing over the accumulation and decumulation phases of the target date fund's investment strategy. Target date funds are described in detail in U.S. Patent Publication No. 2009/0048958, titled "Method of Evaluating the Performance of a Family of Target Date Funds," which is incorporated herein by reference in its entirety.

Overview

An adaptive investing methodology is an asset allocation methodology that provides asset allocations among two or more asset classes over a number of periods. By way of a non-limiting example, each period may be one year long. However, this is not a requirement and periods having other durations, such as one month, three months, and the like, may be used. Further, periods having identical, substantially identical, and non-uniform durations may also be used.

The asset allocations vary based on a set of predetermined investor variables. In other words, the values of the investor variables may be used to lookup the asset allocation for the current period (or other periods) for a particular investor. By way of a non-limiting example, the predetermined investor variables may include one or more of the following:
1. an investor's age (which may be used to determine an amount of time until retirement);
2. an investor's current contribution or savings rate;
3. an investor's current income;
4. an investor's account balance; and
5. optionally, an investor's level of risk tolerance.

In some embodiments, the predetermined investor variables include an investor's withdrawal rate or anticipated retirement spending during retirement.

The asset allocations may be defined or specified in a set of wealth tables (described below) that includes one or more wealth tables. Thus, the set of wealth tables may be used to determine an asset allocation for a particular period based on the values of the investor variables. The set of wealth tables may be implemented as a data structure storing a multi-dimensional look up table. The look up table may include a dimension for each of the predetermined investor variables.

The set of wealth tables may be implemented in a relational database. The set of wealth tables residing in the relational database may be queried using specific values for the predetermined investor variables to obtain an asset allocation for those values.

An adaptive investing methodology may be characterized as having three components: (1) a model, (2) a set of assumptions, and (3) the set of wealth tables. The model is a computer-implemented asset allocation model. The set of assumptions is used to calibrate the model and make sensible projections related to the retirement income needs of investors. The set of wealth tables is obtained from (or generated by) the model. As mentioned above, for each of a plurality of periods, the set of wealth tables maps the values of the investor variables to an allocation between two or more asset classes. By way of a non-limiting example, the asset classes may include a broadly defined growth asset class (which includes equities and other high return and high-risk assets) and a broadly defined capital preservation asset class (which includes fixed income assets). However, this is not a requirement and embodiments in which the asset classes include cash equivalents (e.g., money market instruments), real estate, and/or commodities are within the scope of the present teachings.

Exemplary implementations of each of the three components of the adaptive investing methodology are described in the following sections.

Model

As mentioned above, the model is used to generate the set of wealth tables based at least in part on the set of assumptions. The model may also include assumptions other than those included in the set of assumptions described below.

Figure 1:
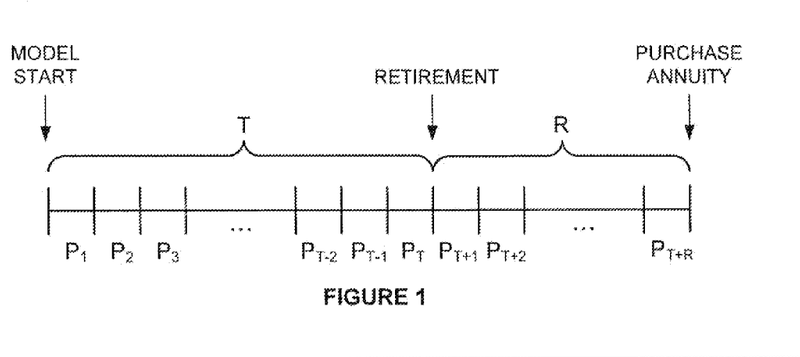
FIG. 1 is a timeline illustrating durations of time used by a model implementing at least a portion of an adaptive investing methodology.

Referring to FIG. 1, the model includes multiple periods (e.g., periods "$P_1$" to "$P_{T+R}$"), which extend from the present (e.g., the start of the period "$P_1$") and end on a date (e.g., the end of the period "$P_{T+R}$") at which an annuity is purchased. The annuity purchased may be an immediate life annuity. However, this is not a requirement. For example, the model may assume that a predetermined amount of wealth is required or that a financial asset other than an annuity (e.g., a bond) is purchased at the end of the period "$P_{T+R}$."

The model does not generate the set of wealth tables for any particular investor. Therefore, the model does not use any actual data related to one or more investors when generating the set of wealth tables. Instead, the model generates the set of wealth tables based on model parameters. By way of a non-limiting example, the model may be described with respect to the following four model parameters, which may vary between investors:
1. a first duration of time "T" (measured in periods in FIG. 1) that starts at the present (labeled "MODEL START") and ends at a future date (labeled "RETIREMENT"), during which money is contributed to an investment account;
2. a second duration of time "R" (measured in periods in FIG. 1) that starts at the end of the first duration of time "T" (labeled "RETIREMENT") and ends at a future date (labeled "PURCHASE ANNUITY") during which money is withdrawn from the investment account;
3. an amount to be invested each period during the first duration of time "T;" and
4. an amount to be withdrawn each period during the second duration of time "R."

In FIG. 1, the first duration of time "T" starts at the beginning of the period "$P_1$," which is also labeled "MODEL START"

and ends at the end of the period "$P_T$," which is also labeled "RETIREMENT." The second duration of time "R" starts at the beginning of the period "$P_{T+1}$," which is also labeled "RETIREMENT" and ends at the end of the period "$P_{T+R}$," which is also labeled "PURCHASE ANNUITY."

The model may also include the following parameters, which do not vary between investors, and may be expressed in the model as stochastic variables:

1. rates of return for assets;
2. rate of inflation; and
3. real interest rate.

The model assumes a non-negative amount is invested into the investment account for each of the periods "$P_1$" to "$P_T$" during the first duration of time "T." These savings are adjusted for inflation (using the rate of inflation), and the amount saved for each of the periods "$P_1$" to "$P_T$" is expressed in current dollars.

In the model, the amounts saved for the periods "$P_1$" to "$P_T$" in the investment account are invested in a portfolio that includes assets belonging to a predetermined number of asset classes (e.g., one, two, three, four, five, etc.). By way of a non-limiting example, the asset classes may include a growth asset class, and a capital preservation asset class. Depending upon the implementation details, the savings may be invested in a single growth asset and a single capital preservation asset. However, this is not a requirement.

As mentioned above, the real rates of return of the assets are each stochastic. In the model, the real rates of return of the assets are represented by stochastic variables having a joint probability distribution. Methods of modeling rates of returns for assets are well known in the art and will not be described in further detail.

At the end of the period "$P_T$," the model assumes contributions to the investment account terminate. In other words, the model assumes the investor stops saving money in the investment account at the end of the period "$P_T$." In some implementations, during the second duration of time "R," at least a portion of the funds are withdrawn from the investment account. Withdrawals may occur each period during the second duration of time "R" and terminate at the end of a period "$P_{T+R}$." However, in some embodiments, no savings or withdrawals may occur during the second duration of time "R" to protect the principal stored in the investment account while the investor transitions to the decumulation phase. Alternatively, the model may assume withdrawals commence at some point during the second duration of time "R."

At the end of the period "$P_{T+R}$," the model assumes an annuity (e.g., an immediate life annuity) is purchased using all or a portion of the funds remaining in the investment account (after the sale of all or a portion of the assets remaining in the portfolio). Thus, the final withdrawal from the investment account may occur at the end of the period "$P_{T+R}$." Purchasing the annuity gives the model a sensible specification that takes into account the fact that the duration of an investor's lifetime is unknown, and at the same time, allows the model to use a fixed duration of time (e.g., the sum of the first and second durations of time "T" and "R").

As is apparent to those of ordinary skill in the art, the purchase price of the annuity is determined at least in part by an investor's age and the prevailing real interest rate. Therefore, the model may use a predetermined investor age (e.g., 85 years old) when determining the purchase price of the annuity. The real interest rate is stochastic. As mentioned above, in the model, the real rates of return of the assets are represented by stochastic variables having a joint probability distribution. The real interest rate may also be represented by a stochastic variable having a joint probability distribution with the real rates of return of the assets. Methods of modeling rates of returns for assets and the real interest rate using joint probability distributions are well known in the art and will not be described in further detail.

At the beginning of the period "$P_1$," the model assumes a current income. The model also determines an income for each period. The income for the period "$P_T$" is a final working income. If the first duration of time "T" includes only a single period, the period "$P_1$" is the same as the period "$P_T$." and the current income is equal to the final working income.

The model may be constructed such that the model parameters that represent monetary values are expressed in terms of the current income. For example, the amount to be invested each period during the first duration of time "T," the amount to be withdrawn each period during the second duration of time "R," and the current account balance at the beginning of the period "$P_1$" may all be expressed as a function (or multiple) of the current income.

Figure 2:
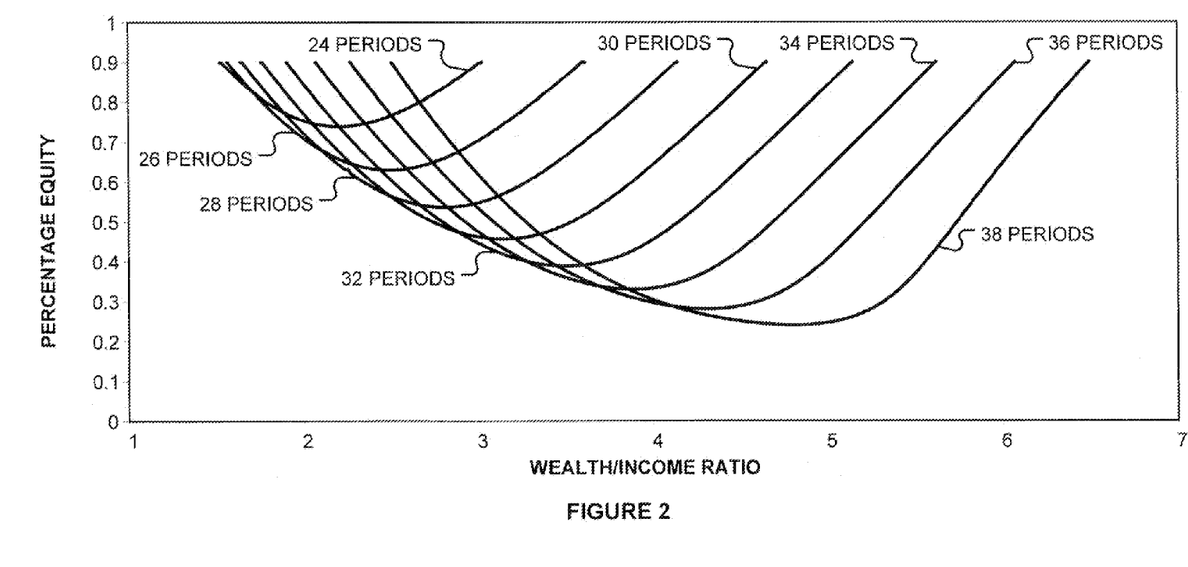
FIG. 2 is a graph of a set of wealth tables for a particular savings rate and a particular anticipated retirement spending illustrating asset allocations based on three predetermined investor variables: an investor's age; current income; and account balance.

The model generates one or more wealth tables for each unique pair of values of (1) the amount to be invested each period during the first duration of time "T," and (2) the amount to be withdrawn each period during the second duration of time "R." For example, FIG. 2 illustrates the asset allocations determined for a selected amount to be invested each period during the first duration of time "T" (e.g., 10% of the current income) and a selected amount to be withdrawn each period during the second duration of time "R" (e.g., 50% of the final working income). Each of contoured lines (labeled "24 periods," "26 periods," "28 periods," "30 periods," "32 periods," "34 periods," "36 periods," and "38 periods") illustrates an asset allocation for a different value of the first duration of time "T." The y-axis is a percentage of the investment account that should be invested in equities (e.g., the growth asset class). The x-axis is a ratio of the current account balance to the current income.

In an alternative embodiment, the model may generate one or more wealth tables for each unique combination of values of the amount to be invested each period during the first duration of time "T," the amount to be withdrawn each period during the second duration of time "R," and a risk tolerance parameter. The risk tolerance parameter may have different values that reflect a level of risk tolerance. Depending upon the implementation details, a lower value may be used to indicate the investor is less willing to take risk and has a lower level of risk tolerance.

Figure 3:
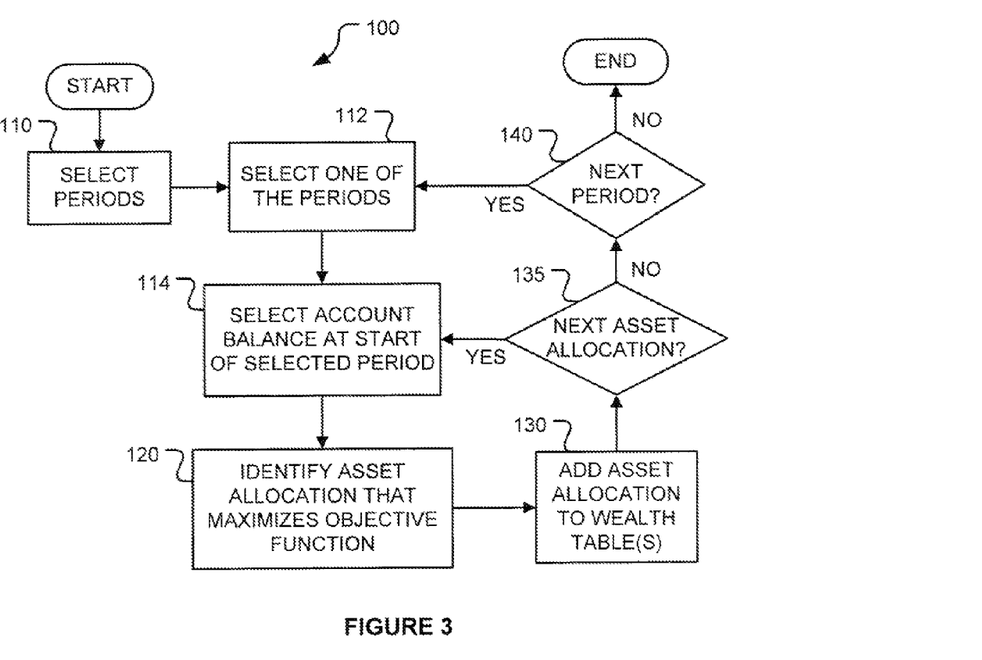
FIG. 3 is a flow diagram of a method of generating a set of wealth tables performed by the model.

FIG. 3 is a flow diagram of a method 100 performed by the computer-implemented model. In first block 110, the model selects a number of periods. For example, in block 110, the model may select the periods "$P_1$" to "$P_T$" of the first duration of time "T." By way of another non-limiting example, in block 110, the model may select the periods "$P_1$" to "$P_{T+R}$" of the first and second durations of time "T" and "R."

In block 112, the model selects one of the periods. In this example, the model selects the last period (e.g., the period "$P_T$" when the periods "$P_1$" to "$P_T$" of the first duration of time "T" were selected in block 110, the period "$P_{T+R}$" when the periods "$P_1$" to "$P_{T+R}$" of the first and second durations of time "T" and "R" were selected in block 110, and the like).

In block 114, the model selects a starting account balance at the start of the period selected in block 112. The starting account balance selected is non-negative. In this example, any contribution to be made to the investment account during the selected period is made at the start of the selected period. Similarly, any withdrawal to be made from the investment account during the selected period is made at the end of the selected period. In alternate embodiments, any withdrawal to be made from the investment account during the selected period may be made at the start of the selected period. Thus, the only change to the account balance that may occur during the selected period is the result of income generated or loss incurred by the investment of the funds in the investment account.

In block 120, the model identifies an asset allocation for the period selected in block 112 (and the starting account balance selected in block 114) that optimizes an objective function. In this example, the objective function is the expected value of annuitized income from the annuity purchased at the end of the period "$P_{T+R}$" minus a value determined by a "shortfall" risk function. Because an investor's lifetime is unknown, the expected value of the annuitized income from the annuity may be the expected value of a predetermined number of payments to be made by the annuity. Methods of calculating an expected value of annuitized income from an annuity purchased at a future date are known to those of ordinary skill in the art and will not be described in detail.

The value of the "shortfall" risk function is the product of the risk tolerance parameter and the square of a shortfall. As mentioned above, the risk tolerance parameter may be a constant or fixed value. A risk averse investor may wish to use asset allocations determined using a smaller value for the risk tolerance parameter to increase the size of the shortfall.

Shortfall is the greater of (a) zero or (b) the purchase price of the annuity minus the account balance at the end of the period "$P_{T+R}$." In such embodiments, the predetermined investor age (e.g., 85 years old) at the end of period "$P_{T+R}$" is used to calculate the purchase price of the annuity used in the shortfall measure. The predetermined investor age may be determined by adding the second duration of time "R" measured in years (e.g., 20 years) to a predetermined retirement age also measured in years (e.g., 65 years old). The purchase price of the annuity may also depend at least in part on the investor's gender. Therefore, the model may use gender-specific mortality tables when calculating the purchase price. In such an embodiment, different wealth tables may be generated for men and women. Alternatively, the model may use unisex mortality tables when calculating the purchase price. Methods of calculating or otherwise determining the purchase price of the annuity are known to those of ordinary skill in the art and will not be described in detail.

Thus, the goal of the objective function is to maximize the account balance at the end of the period "$P_{T+R}$" without too much exposure to the risk that the account balance will be less than the purchase price of the annuity.

In block 130, the model updates the set of wealth tables to include the asset allocation identified in block 120.

In decision block 135, the model determines whether an asset allocation is to be identified for another starting account balance. The decision in decision block 135 is "YES" when an asset allocation is to be identified for another starting account balance. On the other hand, the decision in decision block 135 is "NO" when an asset allocation is not to be identified for another starting account balance. By way of a non-limiting example, the model may include a set of predetermined (non-negative) starting account balances. In this example, the decision in decision block 135 is "YES" until all of the starting account balances in the set have been selected. When all of the starting account balances in the set have been selected, the decision in decision block 135 is "NO."

When the decision in decision block 135 is "YES," the model advances to block 114 to select another starting account balance.

By repeating the blocks 114, 120, 130, and 135, the model generates a portion of the wealth table(s) for the period selected in block 112. This portion of the wealth table(s) depicts a first relationship between the starting account balances at the start of the selected period and the asset allocations identified in block 120.

When the decision in decision block 135 is "NO," the model advances to decision block 140 to determine whether to select another period. In embodiments in which the last period of the periods selected in block 110 was selected the first time block 112 was performed, the decision in decision block 140 is "YES" when a previously unselected period precedes the period selected in block 112. On the other hand, the decision in decision block 140 is "NO" when a previously unselected period does not precede the period selected in block 112.

When the decision in decision block 140 is "NO," the method 100 terminates.

When the decision in decision block 140 is "YES," in block 112, the model selects the period preceding the period selected the last time block 112 was performed. In this manner, by repeating block 112, the method 100 selects each of the periods selected in block 110 from last to first.

By repeating blocks 114, 120, 130, and 135, the model defines a second relationship between the starting account balances at the start of each period and the values of the objective function at the end of the set of periods selected in block 110. For each period (except the last period), the model generates ending account balances at the end of the period that may be used as starting account balances at the start of the next (or subsequent) period. Further, each of the ending account balances at the end of the period (which is also a starting account balance for a subsequent period) is associated with a value of the objective function at the end of the periods selected in block 110.

For example, if the current period is the period "$P_{T-1}$" (i.e., the period "$P_{T-1}$" was selected in block 112), the subsequent period is the period "$P_T$" (i.e., the period "$P_T$" was selected previously in block 112). In this example, the period "$P_T$" is the last period in the set of periods selected in block 110. In blocks 114, 120, 130, and 135, the model determines asset allocations for a set of starting account balances at the start of the current period "$P_{T-1}$." The model also determines a set of ending account balances at the end of the current period "$P_{T-1}$." The model previously determined asset allocations for a set of starting account balances at the start of the subsequent period "$P_T$" as well as the value of the objective function for each starting account balance at the end of the last period. In block 120, the model may determine the value of the objective function for each starting account balance of the current period "$P_{T-1}$" by matching the ending account balances of the current period "$P_{T-1}$" with the starting account balances of the subsequent period "$P_T$." This process is repeated for each period in the set of periods selected in block 110. In this manner, for each of the set of starting account balances at the start of each period except the first period "$P_1$," the model may readily determine the value of the objective function at the end of the last period of the periods selected in block 110. Thus, for a predetermined starting account balance at the start of the first period "$P_1$" (e.g., zero or a non-negative value), the model may readily determine the value of the objective function at the end of the last period of the periods selected in block 110. As mentioned above, for each period, the model selects the asset allocation that maximizes the value of the objective function. Therefore, the second relationship may be used in block 120 to select an asset allocation for each of the periods (except the last period).

The wealth table(s) populated in block 130 may be expressed in terms of the investor variables so that the asset allocation for each period may be looked up in the set of wealth tables using the values of the investor variables. Therefore, in block 130, the asset allocations may be expressed in the set of wealth tables as a function of the values of the investor variables. The set of assumptions described below may be used to map the model parameters to the predetermined investor variables.

By way of a non-limiting example, the set of starting account balances may range from zero to a value large enough to encompass most investors (e.g., ten million dollars). For the periods "$P_1$" to "$P_T$" of the first duration of time "T," the set may include a starting account balance equal to each of a plurality of amounts to be invested each period during the first duration of time "T."

For the amount to be invested each period during the first duration of time "T," the model may use a starting value and a predetermined function to adjust (e.g., increase) the starting value over time. For example, the predetermined function may increase the starting value based on estimated increases in the cost of living and/or estimated changes in the investor's income. By way of non-limiting example, the model may assume the starting value will increase by a predetermined rate each year.

For the amount to be withdrawn each period during the second duration of time "R," the model may use a starting value and a predetermined function to adjust (e.g., increase) the starting value over time. For example, the predetermined function may increase the starting value based on estimated increases in the cost of living and/or estimated changes in the investor's lifestyle.

In some embodiments, the model may be used to model only the periods "$P_{T+1}$" to "$P_{T+R}$" of the second duration of time "R" (e.g., for investors who have already retired). In such embodiments, a predetermined starting account balance at the start of the period "$P_{t+1}$" may be used as an initial retirement income and a portion of the initial retirement income may be selected as the amount to be withdrawn each period during the second duration of time "R."

Assumptions

As mentioned above, the set of wealth tables are used to determine asset allocations for one or more investors. However, the set of wealth tables were not created specifically for any particular investor. Instead, the set of wealth tables were generated based on predetermined values of the model parameters. The set of assumptions map the model parameters to the predetermined investor variables. Thus, the following assumptions may be used to look up (or query) the asset allocations in the set of wealth tables generated by the method 100 described above.

For all investors, the second duration of time "R" (measured in years) may be assumed to be a predetermined number of years (e.g., 20 years). Further, the first duration of time "T" (measured in years) may be determined using a predetermined retirement age (e.g., 65 years old) and the investor's age. Thus, values for the first and second durations of time "T" and "R" may be determined for each investor. For example, using these assumptions, a 45-year-old investor will retire in 20 years (i.e., the first duration of time "T"=20 years) and will make withdrawals from the investment account until age 85. At age 85, the model assumes the investor purchases the annuity. The investor's age may be provided by the record keeper.

The amount to be invested each period during the first duration of time "T" may be determined based on the investor's current income and the savings rate. In other words, for each period during the first duration of time "T," the model assumes the investor saves a proportion (indicated by the savings rate) of the investor's income during the period (calculated based on the investor's current income). The savings rate may be fixed (e.g., 10%). However, this is not a requirement. The model may assume the investor's real (inflation-adjusted) income will grow at a predetermined rate (usually 1.5% per year for an investor based in the U.S.) each period from the investor's current income. In this manner, the investor's income may be determined for each period within the first duration of time "T." Further, the investor's final working income (i.e., the investor's income during the period "$P_T$") may also be determined. The investor's current income and the savings rate may be provided by the record keeper. For example, the record keeper typically knows the portion of the investor's current income being invested in the account and the amount invested. Using this information, the record keeper may calculate the investor's current income.

The amount to be withdrawn each period during the second duration of time "R," may be determined using an investor's anticipated retirement spending. The investor's anticipated retirement spending may be estimated in the same manner that the amount to be withdrawn each period during the second duration of time "R" was estimated by the model. In other words, the investor's anticipated retirement spending may be estimated as a percentage of the investor's final working income (i.e., the investor's income during the period "$P_T$"), which as described above may be estimated from the investor's current income. For example, it may be assumed that the investor's real (inflation-adjusted) income will grow at a predetermined rate (usually 1.5% per year for an investor based in the U.S.) each period from the investor's current income. The percentage of the investor's final working income to be withdrawn from the investment account during the second duration of time "R" may be obtained from the "Replacement Ratio Study" available from AON Corporation of Chicago, Ill. or a similar income replacement information source may be used to help determine the percentage. Based on such information, it is believed the percentage will be less than one hundred percent. The amount to be withdrawn each period may be selected to be large enough to maintain the investor's pre-retirement standard of living. Further, since the percentage of the investor's final working income needed to maintain the pre-retirement standard of living depends on income level, the investor's current income may be used to help specify the percentage. By way of another non-limiting example, a predetermined percentage may be used.

The investor's current account balance may be provided by the record keeper and is mapped directly to the current account balance used by the model and included in the set of wealth tables. The current account balance may include all sources of the investor's money stored by the one or more computing devices 170 operated by a record keeper. Such sources may include but are not limited to rollover accounts, employer accounts, pre-tax employee accounts, post-tax employee accounts, and the like.

Optionally, the investor may provide the record keeper with a value to be used for the risk tolerance parameter. Alternatively, a predetermined fixed value may be used for all investors.

The set of assumptions described above that map the model parameters to the predetermined investor variables help reduce the amount of information needed to use the set of wealth tables. However, the predetermined investor variables may include one or more variables other than those described above, which can also be used as parameters in the model. For example, information about assets outside the portfolio purchased by the investment account as well as other sources of retirement income (e.g., Social Security) can be incorporated into the objective function to give a more holistic strategy for an investor.

In addition to the assumptions described above, the model may also include assumptions related to rates of return and yields for the asset classes. However, as mentioned above, methods of modeling the rates of return for assets, the rate of inflation, and the real interest rate are known in the art and will not be described in further detail herein.

Set of Wealth Tables

The set of wealth tables may be used to obtain asset allocations for one or more sets of values of the predetermined investor variables. Interpolation and similar techniques may be used to obtain the asset allocations for sets of values of the predetermined investor variables that do not map directly to the model parameters used to generate the asset allocations stored in the set of wealth tables.

The set of wealth tables may be delivered to a recipient (e.g., an investor, the record keeper, an investment advisor, and the like) as electronically stored lookup tables. Alternatively, the set of wealth tables may be delivered to a recipient in printed form. The set of wealth tables may be delivered to a recipient (e.g., the record keeper) as one or more data files that can be stored by the recipient in a database, which may be integrated in the recipient's system.

The set of wealth tables may be updated or revised occasionally (e.g., periodically) to reflect changes in the assumptions of the model. The recipient of the set of wealth tables may adjust the asset allocations in one or more investors' portfolios occasionally (e.g., periodically) based on the asset allocations stored in the set of wealth tables. For example, the recipient may adjust the asset allocations in the one or more investors' portfolios quarterly. The adjustment for a particular investor may reflect changes in the values of the investor's variables as well as revisions made to the set of wealth tables.

The set of wealth tables contain all of the information needed by the recipient to implement an investment strategy. Therefore, the recipient does not require access to the model and may avoid costs associated with maintaining and running the model.

System

Figure 4:
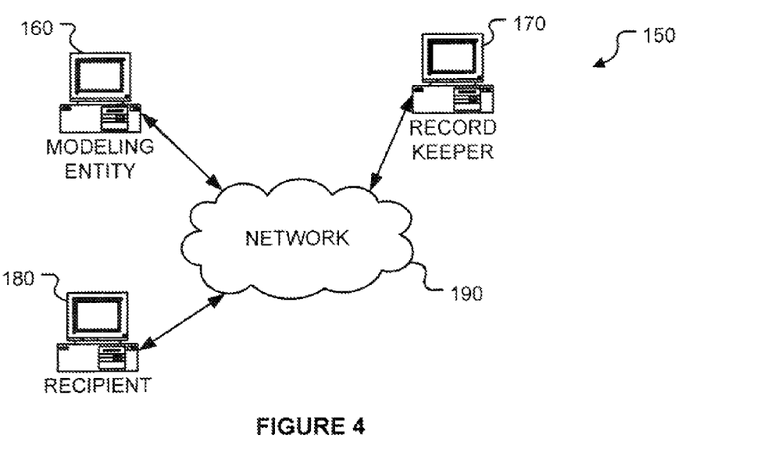
FIG. 4 is a diagram of an exemplary system that may be used to implement the adaptive investing methodology.

FIG. 4 illustrates an exemplary system 150 that may be used to implement an adaptive investing methodology. The system 150 includes one or more computing devices 160 operated by a modeling entity, one or more computing devices 170 operated by a record keeper, and optionally, one or more computing devices 180 operated by one or more recipients of the set of wealth tables generated by the model. The one or more recipients may include an investor, an investment advisor, a record keeper, a plan manager (e.g., of a defined contribution pension plan), or other party wishing to determine an asset allocation for the current period.

In the embodiment illustrated, the computing devices 170 and 180 are connected to one another by a network 190 (e.g., the Internet). The one or more recipients may receive information from the record keeper via the network 190. For example, the one or more recipients may receive the values of the investor variables for one or more investors from the one or more computing devices 170 over the network 190. In such embodiments, the one or more computing devices 180 store or otherwise have access to the set of wealth tables. For each of the one or more investors, the one or more computing devices 180 look up the values of the investor variables for the investor in the set of wealth tables to obtain the asset allocation for the current period. Then, for each investor, if the asset allocation for the current period differs significantly from the current asset allocation, the recipient may change the asset allocation in the investor's portfolio.

The computing devices 160 and 180 are connected to one another by the network 190 (e.g., the Internet). The one or more computing devices 160 may send the set of wealth tables to the one or more computing devices 180 over the network 190. Alternatively, the one or more computing devices 160 may store the set of wealth tables on one or more non-transitory computer-readable mediums and send the one or more non-transitory computer-readable mediums to the one or more recipients.

In the embodiment of the system 150 illustrated in FIG. 4, the computing devices 160 and 170 are connected to one another by the network 190. Optionally, the one or more computing devices 170 may send information (e.g., the values of the investor variables for the one or more investors) to the one or more computing devices 160 for the purposes of configuring the model.

In some embodiments, the record keeper operating the one or more computing devices 170 is the recipient of the set of wealth tables generated by the model. In such embodiments, the one or more computing devices 180 may be omitted from the system 150. The one or more computing devices 160 may send the set of wealth tables to the one or more computing devices 170 over the network 190. Alternatively, the one or more computing devices 160 may store the set of wealth tables on one or more non-transitory computer-readable mediums and send the one or more non-transitory computer-readable mediums to the record keeper. Thus, the one or more computing devices 170 may store or otherwise have access to the set of wealth tables. For each of one or more investors, the one or more computing devices 170 look up the values of the investor variables for the investor in the set of wealth tables to obtain the asset allocation for the current period. Then, for each investor, if the asset allocation for the current period differs significantly from the current asset allocation, the record keeper may change the asset allocation in the investor's portfolio.

In some embodiments, the modeling entity may use the set of wealth tables in the same manner described with respect to the record keeper and/or the recipient. In such embodiments, the one or more computing devices 160 may not send the set of wealth tables to either the one or more computing devices 170 or the one or more computing devices 180. In such embodiments, the one or more computing devices 180 may be omitted from the system 150. The modeling entity may receive information from the record keeper via the network 190. For example, the modeling entity may receive the values of the investor variables for one or more investors from the one or more computing devices 170 over the network 190. Alternatively, the modeling entity may have the values of the investor variables for one or more investors. In such embodiments, the one or more computing devices 170 may be omitted from the system 150. For each of one or more investors, the one or more computing devices 160 look up the values of the investor variables for the investor in the set of wealth tables to obtain the asset allocation for the current period. Then, for each investor, if the asset allocation for the current period differs significantly from the current asset allocation, the modeling entity may change the asset allocation in the investor's portfolio.

Figure 5:
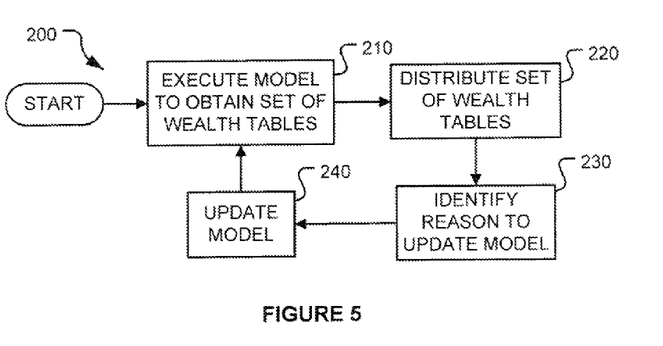
FIG. 5 is a flow diagram of a method performed by a modeling entity of the system of FIG. 4.

FIG. 5 is a flow diagram of a method 200 performed by the modeling entity. In first block 210, the modeling entity configures and executes the model to obtain the set of wealth tables. By way of a non-limiting example, in block 210, the modeling entity may perform the method 100 (see FIG. 3). Then, in block 220, the modeling entity distributes the set of wealth tables to the record keeper and/or one or more recipients (e.g., an investor, an investment advisor, a combination thereof, and the like). In block 230, the modeling entity identifies one or more reasons to update the model. Examples of reasons to update the model may include one or more of the following: changes have occurred in the forecasted returns of the asset classes; changes have occurred in mortality tables used to price the annuity (e.g., an immediate life annuity); and the introduction of new asset classes available for the investment fund. In block 240, the modeling entity updates the model. Then, the modeling entity returns to block 210 to re-execute the model.

While in method 200, the modeling entity distributes the set of wealth tables to the record keeper and/or one or more recipients. In alternate embodiments, instead of distributing the set of wealth tables, the modeling entity may use the set of wealth tables in the same manner described with respect to the recipient. In such alternate embodiments, block 220 may be omitted from the method 200.

Figure 6:
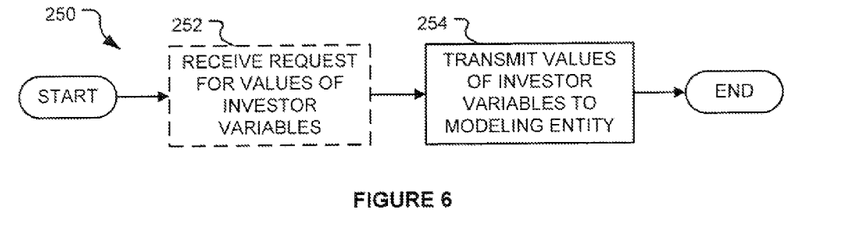
FIG. 6 is a flow diagram of a method performed by a record keeper of the system of FIG. 4.

FIG. 6 is a flow diagram of a method 250 performed by the record keeper. In an optional first block 252, the record keeper may receive a request for the values of the investor variables for one or more investors. In block 254, the record keeper transmits the values of the investor variables for one or more investors to the modeling entity. In embodiments omitting the optional block 252, the record keeper may send the values of the investor variables for one or more investors to the modeling entity occasionally (e.g., periodically). Then, the method 250 terminates.

Figure 7:
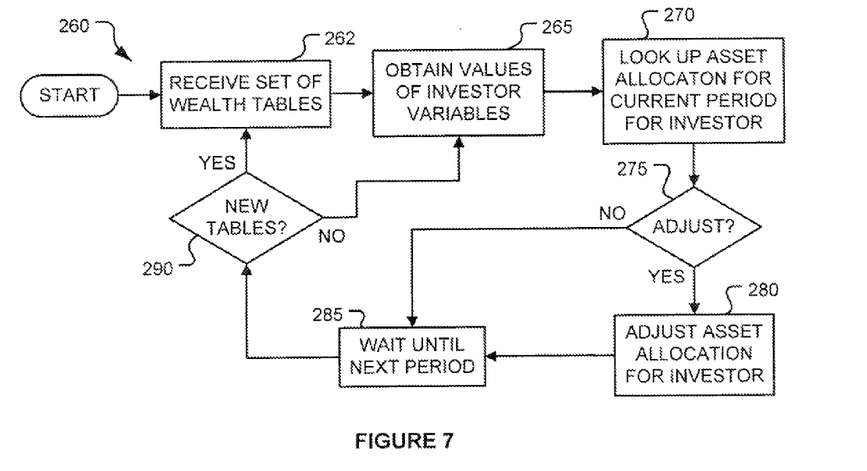
FIG. 7 is a flow diagram of a method that may be performed by one or more recipients of a set of wealth tables generated by the model.

FIG. 7 is a flow diagram of a method 260 that may be performed by each of the one or more recipients and/or the record keeper. For ease of illustration, the method 260 will be described as being performed by a selected one of the recipients. In first block 262, the recipient receives the set of wealth tables from the modeling entity. In block 265, the recipient obtains values for the investor variables for one or more investors from the record keeper. Optionally, in block 265, the recipient may send a request to the record keeper requesting the values of the investor variables for the one or more investors and receive the values of the investor variables for the one or more investors from the record keeper in response to the request. Alternatively, the modeling entity may receive the values of the investor variables for the one or more investors from the record keeper occasionally (e.g., periodically). In block 270, for each of the one or more investors, the recipient looks up the values of the investor variables for the investor in the set of wealth tables to obtain the asset allocation for the current period.

In decision block 275, for each of the one or more investors, the recipient determines whether the asset allocation obtained for the current period differs significantly from the current asset allocation of the investor's portfolio (purchased using funds in the investment account) such that the asset allocation in the investor's portfolio should be modified. The decision in decision block 275 is "YES" when the recipient determines the asset allocation obtained for the current period differs significantly from the current asset allocation of the investor's portfolio. On the other hand, the decision in decision block 275 is "NO" when the recipient determines the asset allocation obtained for the current period does not differ significantly from the current asset allocation of the investor's portfolio.

When the decision in decision block 275 is "YES," in block 280, the recipient modifies the asset allocations in the investor's portfolio. Then, the recipient advances to block 285 to wait until the next period.

When the decision in decision block 275 is "NO," in block 285, the recipient waits until the next period.

Then, in decision block 290, the recipient determines whether a new set of wealth tables is available. The decision in decision block 290 is "YES" when a new set of wealth tables is available. When the decision in decision block 290 is "YES," the recipient returns to block 262. On the other hand, the decision in decision block 290 is "NO" when a new set of wealth tables is not available. When the decision in decision block 290 is "NO," the recipient returns to block 265.

The asset allocations provided by an adaptive investing methodology may be used as an alternative investment strategy to target date funds and managed accounts. For example, the asset allocations may be used by a defined contribution pension plan to determine asset allocations for each participant. By way of another non-limiting example, the asset allocations may be used as an allocation model to fund the anticipated retirement spending for an individual. Further, an adaptive investing methodology may be used as a lifetime investment planning tool that provides asset allocations over an investor's working and retired life.

A defined contribution record keeper or an investment advisor may fully implement the adaptive investing methodology using only the set of wealth tables and need not maintain or directly use the model. This feature may help reduce implementation costs.

By way of yet another non-limiting example, the adaptive investing methodology may be implemented as a software program executed by investment advisors. In such an implementation, an investment advisor may collect the values of the investor variables and input those values into the software program.

Computing Device

Figure 8:
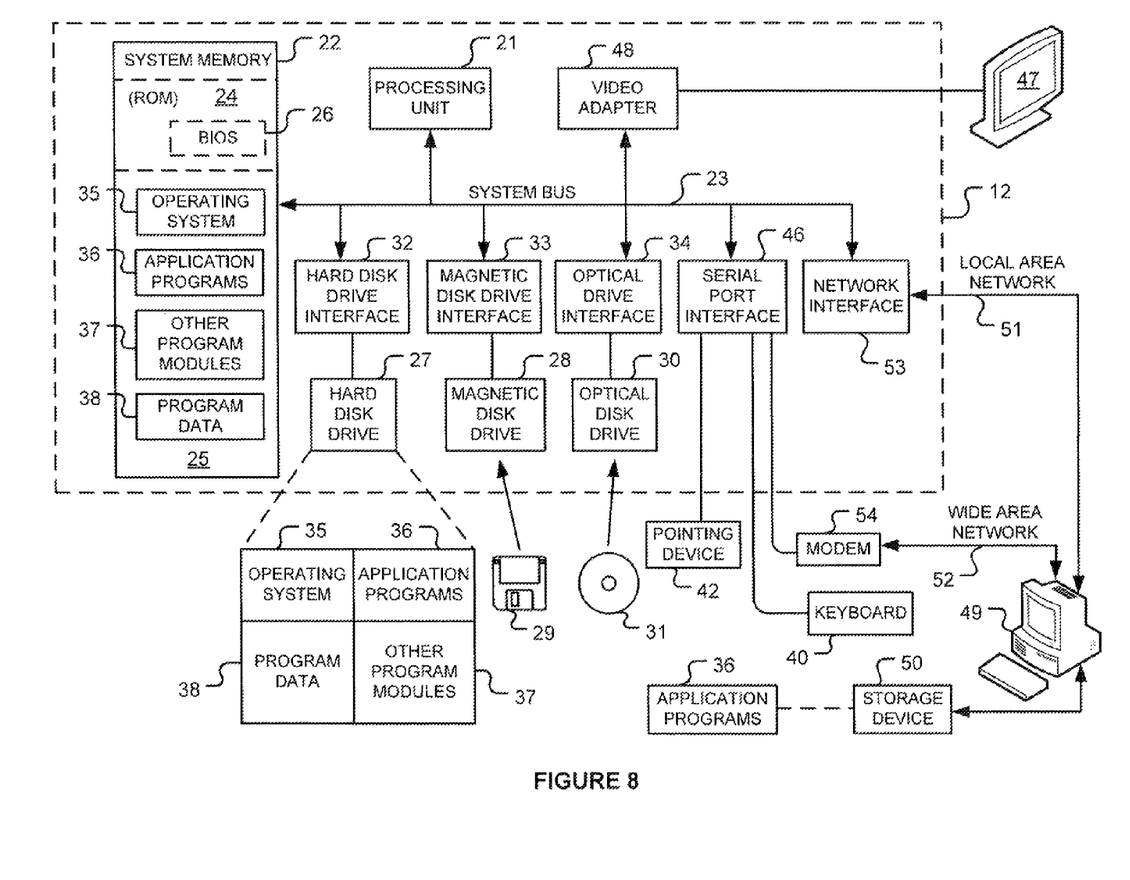
FIG. 8 is a diagram of a hardware environment and an operating environment in which one or more of the computing devices of the system of FIG. 4 may be implemented.

FIG. 8 is a diagram of hardware and an operating environment in conjunction with which implementations of the model and set of wealth tables may be practiced. The description of FIG. 8 is intended to provide a brief, general description of suitable computer hardware and a suitable computing environment in which implementations may be practiced. Such implementations include computer-executable instructions, such as program modules, executed by a computing device, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 8 includes a general-purpose computing device in the form of a computing device 12. Referring to FIG. 4, the one or more computing devices 160, the one or more computing devices 170, and the one or more computing devices 180 may each be implemented using a computing device substantially similar to the computing device 12.

Returning to FIG. 8, the computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types physical feedback (e.g., a force feed back game controller).

The input devices described above are operable to receive user input and selections. Together the input and display devices may be described as providing a user interface. The input devices may be used to receive information from the modeling entity, the record keeper, and/or the investment advisor. The user interface may be used to display the asset allocations, the asset allocation for the current period, at least a portion of the set of wealth tables, and the like.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 8 include a local-area network (LAN) 51 and a wide-area network (WAN) 52. Such networking environments are commonplace in offices, enterprise-wide computer networks, intranets and the Internet. The network 190 (see FIG. 4) may be implemented using at least a portion of the networked environment described above.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The memory of the one or more computing devices 160 operated by the modeling entity stores computer executable instructions that when executed by one or more processors cause the one or more processors to perform all or portions of the methods 100 (see FIG. 3), 200 (see FIG. 5) and 260 (see FIG. 7). Such instructions may be stored on one or more non-transitory computer-readable media.

The memory of the one or more computing devices 170 operated by the record keeper stores processor executable instructions that when executed by one or more processors cause the one or more processors to perform all or portions of the methods 250 (see FIG. 6) and 260 (see FIG. 7). Such instructions may be stored on one or more non-transitory computer-readable media.

The memory of the one or more computing devices 180 operated by the one or more recipients of the set of wealth tables store processor executable instructions that when executed by one or more processors cause the one or more processors to perform all or portions of the method 260 (see FIG. 7). Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method comprising:
 determining, by one or more computing devices, an asset allocation for each of a plurality of periods of a model duration that optimize an objective function, the asset allocations identifying for each of the plurality of periods of the model duration how much of an investment account to invest in one or more asset classes, the objective function comprising subtracting a value of a shortfall risk function from an expected value of an amount of income to be generated by an annuity purchased at the end of the model duration with funds in the investment account at the end of the model duration, wherein determining the asset allocation for each of the plurality of periods of the model duration that optimize the objective function comprises:
  (a) determining a purchase rice of the annuity;
  (b) determining a shortfall by subtracting a balance of the investment account at the end of the model duration from the purchase price of the annuity;
  (c) if the shortfall is less than or equal to zero, determining the value of the shortfall risk function is zero; and
  (d) if the shortfall is greater than zero, determining the value of the shortfall risk function as a product of the shortfall squared and a risk tolerance parameter; and
 associating, by the one or more computing devices, the asset allocations with values of a plurality of investor variables.

2. The method of claim 1, wherein the one or more asset classes comprise:
 a growth asset class; and
 a capital preservation asset class.

3. The method of claim 1, wherein the one or more asset classes comprise at least one of equities, fixed-income assets, cash equivalents, real estate, and commodities.

4. The method of claim 1, further comprising:
 storing the asset allocations and the associated values of the plurality of investor variables in one or more wealth tables; and
 providing the one or more wealth tables to a recipient.

5. The method of claim 1, wherein the plurality of investor variables comprises:
 a current account balance;
 an investor's age;
 a current income; and
 a savings rate.

6. The method of claim 5, wherein the plurality of investor variables further comprises an anticipated retirement spending.

7. The method of claim 6, wherein the plurality of investor variables further comprises an indicator of the investor's level of risk tolerance.

8. The method of claim 5, wherein the plurality of investor variables further comprises an indicator of the investor's level of risk tolerance.

9. A system comprising:
 one or more modeling entity computing devices connected to a network, the one or more modeling entity computing devices being configured to generate one or more wealth tables and transmit the one or more wealth tables over the network, the one or more modeling entity computing devices generating the one or more wealth tables based on a plurality of sets of values for a plurality of parameters of an objective function by optimizing the objective function for each of the sets of values to obtain asset allocations associated with the set of values, the objective function comprising for each of the sets of values, subtracting a value of a shortfall risk function from an expected value of an amount of income to be generated by an annuity purchased at the end of a model duration with funds in an investment account invested according to the asset allocations associated with the set of values, the one or more modeling entity computing devices determining the value of the shortfall risk function by determining a purchase price of the annuity, and for each of the sets of values, (a) determining a shortfall by subtracting a balance of the investment account invested according to the asset allocations associated with the set of values at the end of the second duration from the purchase price of the annuity, (b) determining the value of the shortfall risk function is zero if the shortfall is less than or equal to zero, and (c) determining the value of the shortfall risk function as a product of the shortfall squared and a risk tolerance parameter if the shortfall is greater than zero, the one or more modeling entity computing devices associating the asset allocations with values of a plurality of investor variables, and storing the asset allocations and the associated values of the plurality of investor variables in the one or more wealth tables;

one or more record keeper computing devices configured to transmit one or more sets of values of the plurality of investor variables, each of the one or more sets of values of the plurality of investor variables being associated with an investor; and one or more recipient computing devices connected to the one or more record keeper computing devices and the one or more modeling entity computing devices by a network, the one or more recipient computing devices being configured to receive the one or more wealth tables from the one or more modeling entity computing devices, and the one or more sets of values of the plurality of investor variables transmitted by the one or more record keeper computing devices over the network, the one or more recipient computing devices being further configured to look up each of the one or more sets of values of the plurality of investor variables in the one or more wealth tables to obtain a new asset avocation for the investor associated with the set of values of the plurality of investor variables, and modify a current asset allocation of a portfolio associated with the investor based on the new asset allocation.

10. The system of claim 9, wherein assets in the portfolio associated with the investor are purchased with funds in an investment account, the model duration comprising a first duration during which funds are contributed to an investment account and a second duration during which funds are withdrawn from the investment account, and the plurality of parameters comprises:
   a first number of periods in a first duration during which funds are contributed to the investment account;
   an amount invested in the investment account for each period of the first number of periods;
   a second number of periods in a second duration during which funds are withdrawn from the investment account; and
   an amount withdrawn from the investment account for each period of the second number of periods.

11. The system of claim 10, wherein the plurality of investor variables comprises:
   the current balance of the investment account;
   the age of the investor associated with the investment account;
   a current income of the investor associated with the investment account; and
   a savings rate.

12. The system of claim 11, wherein the plurality of investor variables further comprises an anticipated retirement spending.

* * * * *